United States Patent Office 2,695,943
Patented Nov. 30, 1954

2,695,943

WELD ROD COATING

Arthur T. Cape, Los Angeles, Calif., and Charles V. Foerster, West Englewood, N. J., assignors to Coast Metals, Inc., Little Ferry, N. J., a corporation of Delaware No Drawing. Application August 22, 1951, Serial No. 243,178

7 Claims. (Cl. 219—8)

This invention relates, as indicated, to weld rod coatings, but has reference more particularly to coatings of the graphite type.

A primary object of the invention is to provide a coating having substantial amounts of monazite therein, whereby deposits of various metals provided with such coatings exhibit a substantial increase in impact resistance and hardness, as compared with deposits of the same metals provided with coatings, which are free from monazite.

Another object of the invention is to provide a coating of the character described, which produces an improved arc action during the welding operation.

A further object of the invention is to provide a weld rod coating, which enables lower amperages to be used, that is to say, a wider range of current values can be used for the same size rod.

A still further object of the invention is to provide a weld rod coating having improved physical strength and bonding properties.

Other objects and advantages of the invention will become apparent during the course of the following description.

In accordance with the invention, monazite, which is essentially $RPO_4$ (where R stands for any rare earth element), with generally 4 to 12 per cent of thorium phosphate, is used as an ingredient of the weld rod coating. Although composed largely of cerium earths, it also contains a few per cent, 1 to 5, of the yttrium subgroup of elements.

The monazite, in amounts up to about 15% by weight of the weld rod coating, is mixed with graphite (or plumbago) and a binder, such as sodium silicate, and is worked into a homogeneous mass, or paste, which may be applied in any conventional manner to the weld rods. The weld rods, to which the coatings are applied are usually iron base alloys, but the invention is not intended to be limited in this respect. After being applied to the rods, the coatings are dried.

In preparing the coatings for application to weld rods, other ingredients or constituents may be added or incorporated, such as various minerals other than monazite, magnesite, ferro-silicon, etc.

As examples of coatings which have been prepared and used successfully, the following are given:

*Coating No. 1*

38 parts graphite
20 parts sodium silicate
12 parts monazite
12 parts ferro-silicon (50%)
16 parts water

*Coating No. 2*

50 parts calcium carbonate
17 parts sodium silicate
17 parts silica flour
17 parts feldspar
15 parts monazite In the second of the above examples, which, except for the monazite, is an ordinary type of weld rod coating, the monazite is particularly effective in increasing the rate of weld deposition, and influences the soundness and quality of the deposits.

Through the use of weld rod coatings of the aforesaid type, the following advantages and improved results have been noted:

(a) The weld deposits show a marked increase in impact resistance over similar deposits from weld rods having the same coatings, but containing no monazite.

(b) The hardness of the weld deposit is uniformly higher.

(c) The arc action during welding is greatly improved.

(d) The coating itself has better physical strength and bonding qualities than conventional coatings.

(e) The weld deposits themselves contain no spectroscopically detectable amounts of cerium.

It will be understood that various changes can be made in the proportions of the various ingredients of the coating, without departing from the spirit of the invention or the scope of the appended claims.

Having thus described my invention, I claim:

1. A weld rod having a coating thereon containing monazite, graphite and sodium silicate, the monazite being present in amounts up to about 15% of the weight of the coating.

2. A weld rod having a coating thereon, containing about 38 parts of graphite, about 20 parts of sodium silicate, about 12 parts of monazite and about 12 parts of ferror-silicon (containing 50% silicon).

3. A weld rod having a coating thereon, containing about 50 parts calcium carbonate, about 17 parts silica flour, about 17 parts feldspar, about 17 parts sodium silicate, and about 15 parts monazite.

4. A weld rod formed of an iron base alloy, and having a homogeneous, fusible coating thereon containing monazite in an amount up to about 15% of the weight of the coating.

5. A coating for weld rods, said coating comprising, in addition to binders and other fluxing agents, the improvement comprising monazite up to 15% by weight of the coating composition.

6. A coating for weld rods, said coating containing monazite, graphite and a binder, the monazite being present in amounts up to about 15% of the weight of the coating.

7. A coated weld rod, the coating of which comprises, in addition to binders and other fluxing agents, the improvement comprising monazite up to 15% by weight of the coating composition.

References Cited in the file of this patent

UNITED STATES PATENTS

| Number | Name | Date |
|---|---|---|
| 1,517,292 | Jones | Dec. 2, 1924 |
| 1,936,010 | Pape | Nov. 21, 1933 |
| 1,977,278 | Judy | Oct. 16, 1934 |
| 2,037,596 | Schaub | Apr. 14, 1936 |
| 2,515,559 | Lancaster | July 18, 1950 |
| 2,540,811 | Corbine | Feb. 6, 1951 |